(12) United States Patent
Yamanaka (10) Patent No.: US 7,515,222 B2
(45) Date of Patent: Apr. 7, 2009

(54) LIQUID CRYSTAL TELEVISION SET, LIQUID CRYSTAL DISPLAY

(75) Inventor: Takahito Yamanaka, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 351 days.

(21) Appl. No.: 11/583,220

(22) Filed: Oct. 18, 2006

(65) Prior Publication Data

US 2007/0091226 A1    Apr. 26, 2007

(30) Foreign Application Priority Data

Oct. 24, 2005   (JP)   .................. P2005-008784 U (51) Int. Cl.
    *G02F 1/1333*   (2006.01)
(52) U.S. Cl. .................... 349/58; 348/794; 348/836
(58) Field of Classification Search ............. 349/58; 348/794, 836
    See application file for complete search history.

(56) References Cited

U.S. PATENT DOCUMENTS

| 5,410,373 | A | * | 4/1995 | Sagues et al. ............. 348/825 |
| 5,455,743 | A | * | 10/1995 | Miyajima ................. 361/781 |
| 6,672,560 | B1 |  | 1/2004 | Hart |
| 2002/0180661 | A1 |  | 12/2002 | An |
| 2005/0237438 | A1 |  | 10/2005 | Maruta |
| 2007/0146558 | A1 | * | 6/2007 | Urisu ..................... 348/794 |
| 2007/0206123 | A1 | * | 9/2007 | Hsieh et al. ............. 348/794 |

FOREIGN PATENT DOCUMENTS

| EP | 1312851 | 5/2003 |
| EP | 1617314 | 1/2006 |
| GB | 2336964 | 11/1999 |
| GB | 2347819 | 9/2000 |
| JP | 02-179097 | 7/1990 |
| JP | 08-126087 | 5/1996 |
| JP | 10-164464 | 6/1998 |
| JP | 2000-333100 | 11/2000 |
| JP | 2001-309277 | 11/2001 |

(Continued)

OTHER PUBLICATIONS

The extended European search report, pursuant to Rule 44a EPC dated May 16, 2007, searched on May 4, 2007.

*Primary Examiner*—Sung H Pak
(74) *Attorney, Agent, or Firm*—Yokoi & Co., U.S.A., Inc.; Peter Ganjian (57) ABSTRACT

Conventionally, a fixing bracket attached to a rear inside wall of a main body of a liquid crystal television set or a liquid crystal display would interfere with the main body, generating chatter. A hook part having a bent tip erected in a protruding manner from a rear inside wall of a main body of a liquid crystal television set or a liquid crystal display is passed through a second through hole of a fixing bracket from the inside wall side to a front side of the main body. A peripheral portion of the second through hole is inserted in a recess of the rear inside walls of the main body, and is hooked there. Accordingly, when the fixing bracket is hooked, the fixing bracket and the tip of the boss erected from the rear inside wall of the main body come in contact with each other to be fixed.

9 Claims, 11 Drawing Sheets

FOREIGN PATENT DOCUMENTS

| | | |
|---|---|---|
| JP | 2001-359022 | 12/2001 |
| JP | 2003-008252 | 1/2003 |
| JP | 2003-015542 | 1/2003 |
| JP | 2003-066863 | 3/2003 |
| JP | 2004-126456 | 4/2004 |
| JP | 3102924 U | 7/2004 |
| JP | 3599332 | 12/2004 |
| JP | 2006-030672 | 2/2006 |

* cited by examiner

LIQUID CRYSTAL TELEVISION SET, LIQUID CRYSTAL DISPLAY

CROSS-REFERENCES TO RELATED APPLICATIONS

The present application is related to the Japanese Utility Model Application No. 2005-8784, filed Oct. 24, 2005, the entire disclosure of which is expressly incorporated by reference herein.

BACKGROUND OF THE INVENTION (1) Field of the Invention

The present invention relates to a liquid crystal display or a liquid crystal television set. In particular, it relates to a liquid crystal display or a liquid crystal television set wherein a display panel is accommodated in a main body comprising a front cabinet and a back cabinet.

(2) Description of the Related Art

Conventionally, an apparatus of this kind comprises a liquid crystal display panel for showing images and a main body having a front cabinet and a back cabinet. In the above structure, the main body is formed by attaching the front cabinet to the front side of the back cabinet and they are fixed to accommodate the liquid crystal display panel inside.

In the apparatus of the above structure, there exists a gap between fitting portions of components making up the apparatus. Therefore, the main body vibrates due to sound vibration generated by a speaker etc., and chatter is produced by the interference among the components. To prevent this, there is a method known wherein a gap is eliminated by forming a rib on the fitting surface of the front and back cabinets to turn the surface contact into a linear contact so as to prevent chatter (See, for example, Japanese Patent Laid-open No. 2001-359022).

Also, there is a method known wherein, when a speaker for outputting sound is accommodated in the main body, the gap in the mounting portion of the speaker and the back cabinet is eliminated by pressing the top of the speaker by a guide rail etc. so that an unusual noise is prevented (See, for example, Japanese Patent Laid-open No. Hei 10-164464).

Figure 10:
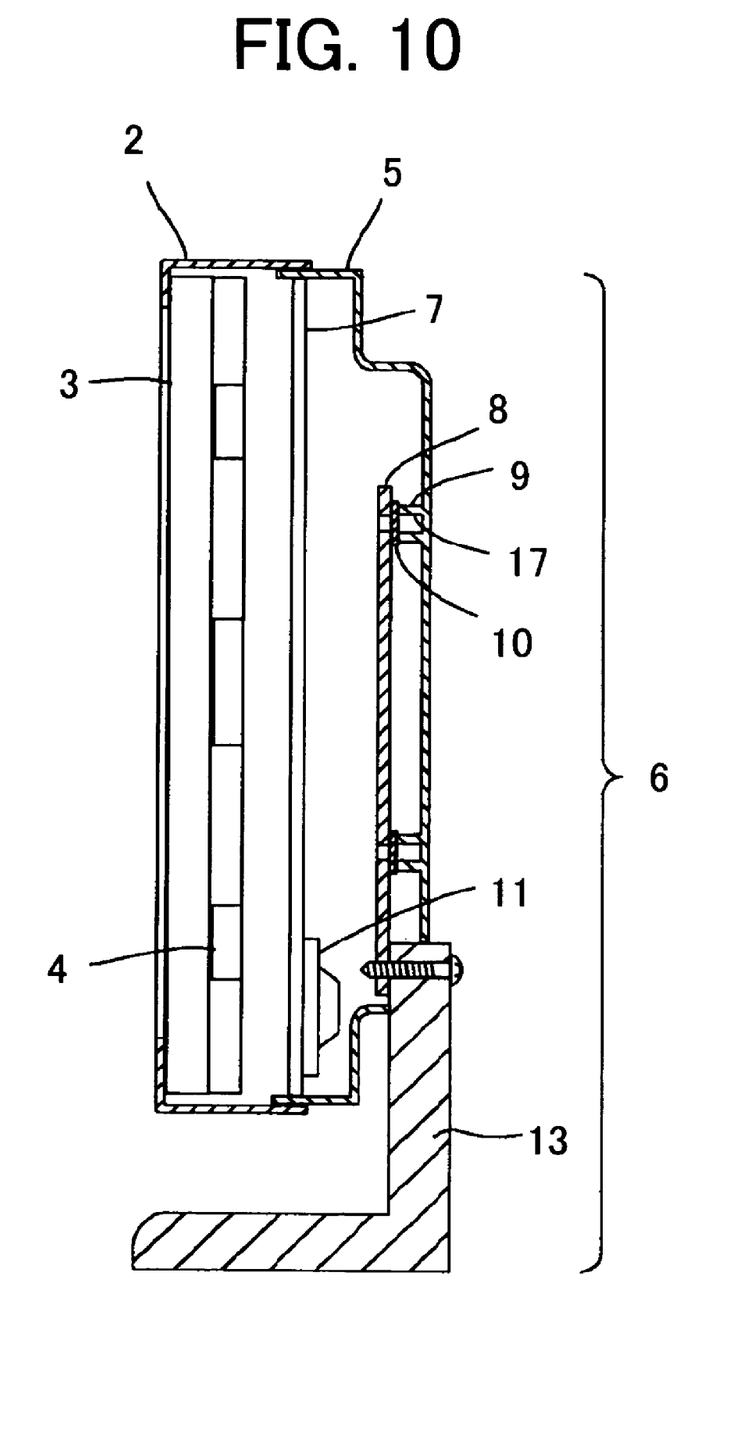
FIG. 10 is an exemplary illustration of a conventional liquid crystal television set.

FIG. 10 shows a structure of a conventional liquid crystal television set 1. The liquid crystal television set 1 comprises: a liquid crystal display panel 3 provided with a backlight 4 comprising an inverter circuit and a fluorescent tube, and composed of a plurality of picture elements for displaying an image; a speaker 11 outputting sound based on an audio signal; a circuit board 7 receiving a television broadcast, displaying a picture signal on the liquid crystal display panel 3, having the speaker 11 output the sound, and including a primary side power supply circuit; a resin front cabinet 2 forming a display window for the liquid crystal display panel in the front thereof; a resin back cabinet 5 attached to the back of the front cabinet 2; a plate-like metal fixing bracket 8 attached to a rear inside wall of the back cabinet 5; four thin cylindrical bosses 9 each having a first through hole 12; and a support leg 13 supporting the main body from below through the medium of the fixing bracket 8. The boss 9 is erected in a protruding manner from the rear inside wall of the back cabinet and has the first through hole 12 which passes through the boss in its axial direction and the rear inside wall of the back cabinet 5.

Figure 11:
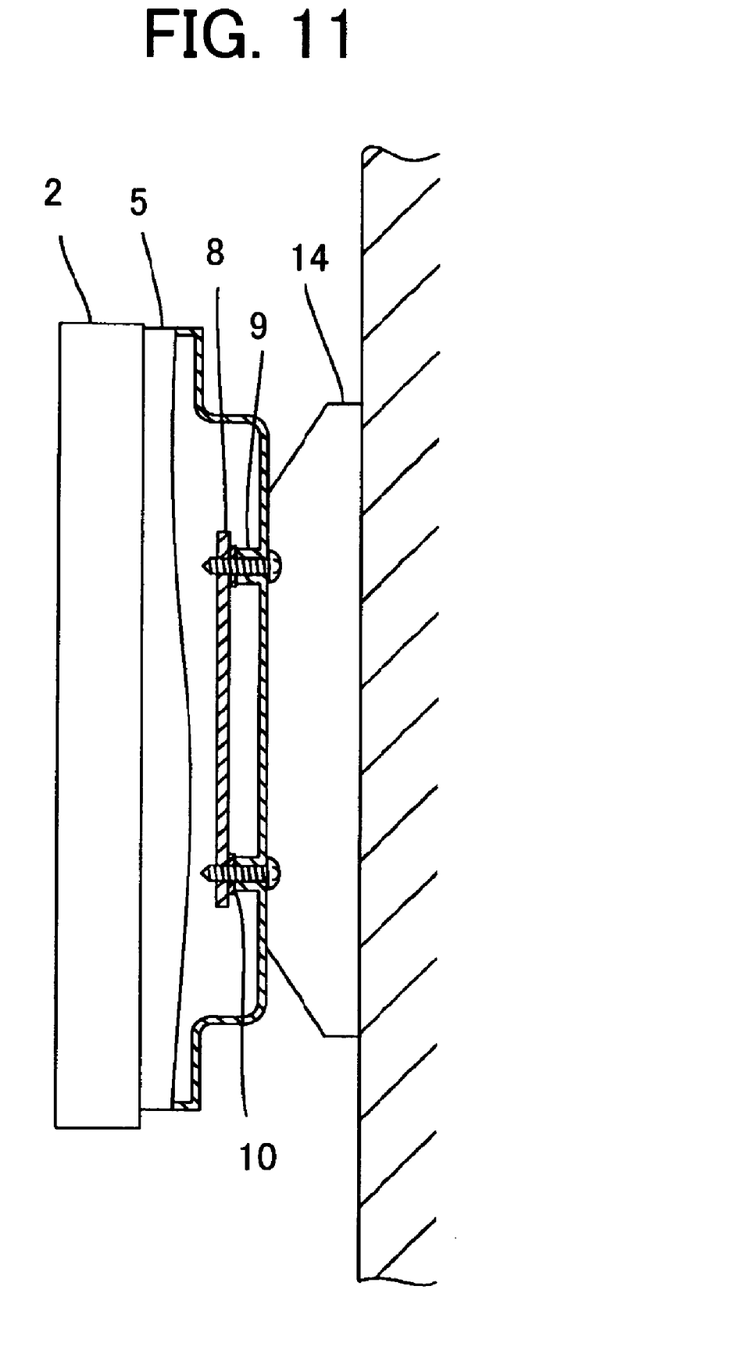
FIG. 11 is an exemplary illustration of a liquid crystal television set hung on a wall by using a hanger member.

Moreover, one feature of the liquid crystal television set 1 is being thin and it can be hung on a wall by use of a hanger member 14. FIG. 11 shows the liquid crystal television set 1 hung on a wall by using the hanger member 14.

In this regard, the hanger member 14 is fixed to the back cabinet 5 by removably screwed to the fixing bracket 8 with screws passing through the bosses 9.

In the above structure of the liquid crystal television set 1, when supporting the liquid crystal television set 1 by use of the support leg 13, the screws etc. fastening the hanger member 14 and the fixing bracket 8 are loosened to remove the hanger member 14. At this time, the screws fastening the hanger member 14 and the fixing bracket 8 and passing through the bosses 9 are removed, leaving a gap between each boss 9 and the fixing bracket 8. For this reason, if the main body vibrates by sound vibration etc. from the speaker 1, the bosses 9 and the fixing bracket 8 interfere with each other by mutual vibration, generating chatter. Conventionally, in order to prevent the chatter, a nonwoven fabric 10 is provided between the boss 9 and the fixing bracket 8 so that the chatter which may be caused by interference between the bosses 9 and the fixing bracket 8 is prevented.

The above-mentioned structure disclosed in Japanese Patent Laid-open No. 2001-359022 is effective in the structure allowing the back cabinet 5 to slidably contact the front cabinet 2 and joining them. However, it is only effective in preventing the chatter of the portion fixed by fitting the openings of components.

The structure disclosed in Japanese Patent Laid-open No. Hei 10-164464 is for pressing and fixing a speaker by use of a guide rail etc., and since the guide rail is needed above the component to be pressed, the shape of the structure has to be limited.

The structures for the liquid crystal television set 1 shown in FIGS. 10 and 11 have the following problems. First, in a manufacturing process, a worker may forget to provide the nonwoven fabric 10. Moreover, even if the nonwoven fabric 10 is provided, the adhesion of the nonwoven fabric 10 may be weak and the nonwoven fabric 10 may come off during the shipment. The inside of the liquid crystal television set I is covered with the main body 6 comprising the back cabinet 5 and the front cabinet 2, and is very difficult to inspect the existence of the nonwoven fabric 10 after completion of a product. For this reason, a liquid crystal television set 1 without the nonwoven fabric 10 placed in a prescribed position may be provided to a user who, in turn, complains about chatter.

BRIEF SUMMARY OF THE INVENTION

The present invention discloses a liquid crystal television set or a liquid crystal display which can prevent chatter.

One aspect of the present invention provides a liquid crystal television set comprising: a liquid crystal display panel provided with a backlight including an inverter circuit and a fluorescent tube, and formed of a plurality of picture elements for displaying an image; a speaker outputting sound based on an audio signal; a circuit board receiving a television broadcast, having the liquid crystal display panel show the image, having the speaker output the sound, and including a primary side power supply circuit; a main body made up of a resin front cabinet forming a display window for the liquid crystal display panel in the front thereof and a resin back cabinet attached to the back of the front cabinet and accommodating the liquid crystal display panel, the speaker, and the circuit board; a plate-like fixing bracket attached to a rear inside wall of the back cabinet; a support leg supporting the main body from below through the medium of the fixing bracket; and a hanger member attached to the back of the cabinet, four bosses with tips contacting the fixing bracket being erected on the rear inside wall of the back cabinet so that lines connecting the four bosses form a substantial quadrangle, each boss being provided with a first through hole passing through the boss in its erected direction and also passing through the rear inside wall of the back cabinet, and the hanger member being removably fastened to the fixing bracket with screws passing through the first through holes, wherein, on the rear inside wall of the back cabinet, there is erected a hook part, protruding towards the fixed bracket, between opposing sides of the substantial quadrangle formed by the lines connecting the bosses, the tip of the hook part being bent in the shape of a hook; wherein the fixing bracket has a second through hole through which the tip of the hook part can pass towards the boss erected corresponding to the position of the hook part; wherein the tip of the hook part can pass through the second through hole of the fixing bracket from the side of the rear inside wall of the back cabinet to the front side, insert a peripheral portion of the second through hole of the fixing bracket in a recess of the rear inside wall of the back cabinet to hook the peripheral portion there and, also, is positioned such that a pressing force is applied to the fixing bracket from the tip of the boss contacting the fixing bracket when the fixing bracket is hooked; wherein, when each of the screws passing through the boss is unscrewed and the hanger member is removed, with respect to the fixing bracket hooked by the hook part, the pressing force is applied to the fixing bracket from the tip of the boss contacting the fixing bracket; wherein, at the tip of the boss erected on the rear inside wall of the back cabinet, plastic ribs thinner than the boss are formed twofold facing the fixing bracket; and wherein the fixing bracket is fastened to the rear inside wall of the back cabinet with screws.

Namely, the four bosses whose tips are in contact with the fixing bracket are so erected on the rear inside wall of the back cabinet that the lines connecting the four bosses form the substantial quadrangle. The first through hole is formed in each boss in the direction in which the boss is erected and to pass through the rear inside wall of the back cabinet. Also, the hanger member is removably fastened to the fixing bracket with the screws passing through the first through holes. Further, on the rear inside wall of the back cabinet, there is erected the hook part between two opposing sides of the substantial quadrangle formed by the lines connecting the bosses. The hook part protrudes towards the fixing bracket and its tip is bent in the shape of a hook. The fixing bracket has the second through hole thorough which the tip of the hook part can pass towards the boss erected corresponding to the position of the hook part. The tip of the hook part can pass through the second through hole in the fixing bracket from the rear inside wall side of the back cabinet to the front side, and insert the peripheral portion of the second through hole in the recess of the rear inside wall of the back cabinet to hook the peripheral portion there. Also, the tip of the hook part is positioned such that a pressing force is applied to the fixing bracket from the tip of the boss contacting the fixing bracket when the fixing bracket is hooked. With the above structure, when the screw passing through the boss is unscrewed and the hanger member is removed, with respect to the fixing bracket hooked by the hook part, the pressing force is applied to the fixing bracket from the tip of the boss contacting the fixing bracket. Further, at the tip of the boss erected on the rear inside wall of the back cabinet, the plastic ribs thinner than the boss are formed twofold facing the fixing bracket. The fixing bracket is fastened to the rear inside wall of the back cabinet with the screws.

According to the present invention, there is provided a liquid crystal television set or a liquid crystal display capable of eliminating a gap between a fixing bracket and a rear inside wall of a main body and preventing chatter.

Such a technique of filling the gap between the back cabinet and the fixing bracket and preventing the chatter can be applied not only to the above-described liquid crystal television set but also to a liquid crystal display. Therefore, another aspect of the present invention provides a liquid crystal display comprising: a main body having a cabinet forming a display window for the liquid crystal display panel in the front thereof; a plate-like fixing bracket attached to a rear inside wall of the cabinet; a support leg supporting the main body from below through the medium of the fixing bracket; and a hanger member attached to the back of the cabinet, a plurality of bosses with tips contacting the fixing bracket being erected on the rear inside wall of the cabinet, each boss being provided with a first through hole passing through the boss in its erected direction and also passing through the rear inside wall of the cabinet, and the hanger member being removably fastened to the fixing bracket with screws passing through the first through holes, wherein, on the rear inside wall of the cabinet, there is erected a hook part, protruding towards the fixing bracket, between the bosses, the tip of the hook part being bent in the shape of a hook; wherein the fixing bracket has a second through hole through which the tip of the hook part can pass towards the boss erected corresponding to the position of the hook part; wherein the tip of the hook part can pass through the second through hole of the fixing bracket from the side of the rear inside wall of the cabinet to the front side, insert a peripheral portion of the second through hole of the fixing bracket in a recess of the rear inside wall of the cabinet to hook the peripheral portion there and, also, is positioned such that a pressing force is applied to the fixing bracket from the tip of the boss contacting the fixing bracket when the fixing bracket is hooked; and wherein, when each of the screws passing through the boss is unscrewed and the hanger member is removed, with respect to the fixing bracket hooked by the hook part, the pressing force is applied to the fixing bracket from the tip of the boss contacting the fixing bracket.

Namely, a plurality of bosses whose tips are in contact with the fixing bracket are erected on the rear inside wall of the cabinet. The first through hole is formed in each boss in the direction in which the boss is erected and to pass through the rear inside wall of the cabinet. The hanger member is removably fastened to the fixing bracket with the screws passing through the first through holes. Also, on the rear side wall of the cabinet, there is erected the hook part, protruding towards the fixing bracket, between the bosses, the tip of the hook part being bent in the shape of a hook. Further, the fixing bracket has the second through hole through which the tip of the hook part can pass towards the boss erected corresponding to the position of the hook part. The tip of the hook part can pass through the second through hole of the fixing bracket from the side of the rear inside wall of the cabinet to the front side, and insert the peripheral portion of the second through hole of the fixing bracket in the recess of the rear inside wall of the cabinet to hook the peripheral portion there. Also, the tip of the hook part is positioned such that the pressing force is applied to the fixing bracket from the tip of the boss contacting the fixing bracket when the fixing bracket is hooked. With the above structure, when the screw passing through the boss is unscrewed and the hanger member is removed, with respect to the fixing bracket hooked by the hook part, the pressing force is applied to the fixing bracket from the tip of the boss contacting the fixing bracket.

In this regard, the hook part may be the one positioned such that the pressing force is applied to the fixing bracket from the tip of the boss contacting the fixing bracket when hooking the fixing bracket as well as the one capable of passing though the second through hole in the fixing bracket from the side of the rear inside wall of the cabinet to the front side, inserting the peripheral portion of the second through hole of the fixing bracket in the recess of the rear inside wall, and hooking the peripheral portion there. Therefore, the fixing bracket and the cabinet may be fixed by the hook parts alone. Alternatively, the fixing bracket and the cabinet may be fastened by screws.

One optional aspect of the present invention provides a liquid crystal display, wherein a plurality of plastic ribs thinner than the boss is formed, facing the fixing bracket, at the tip of the boss erected on the rear inside wall of the cabinet.

Namely, at the tip of the boss protruding from the rear inside wall of the back cabinet, the plurality of plastic ribs thinner than the boss is further formed facing the fixing bracket and, thereby, the ribs are strain-deformed to reduce the gap between the fixing bracket and the boss.

Another optional aspect of the present invention provides a liquid crystal display, wherein the fixing bracket is fastened to the rear inside wall of the cabinet with screws.

Namely, since the fixing bracket and the back cabinet are fastened with screws, the fixing bracket and the boss come into contact closer, the gap between the fixing bracket and the boss being further reduced. Also, stiffness of the fixed portion of the fixing bracket and the boss can be improved.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
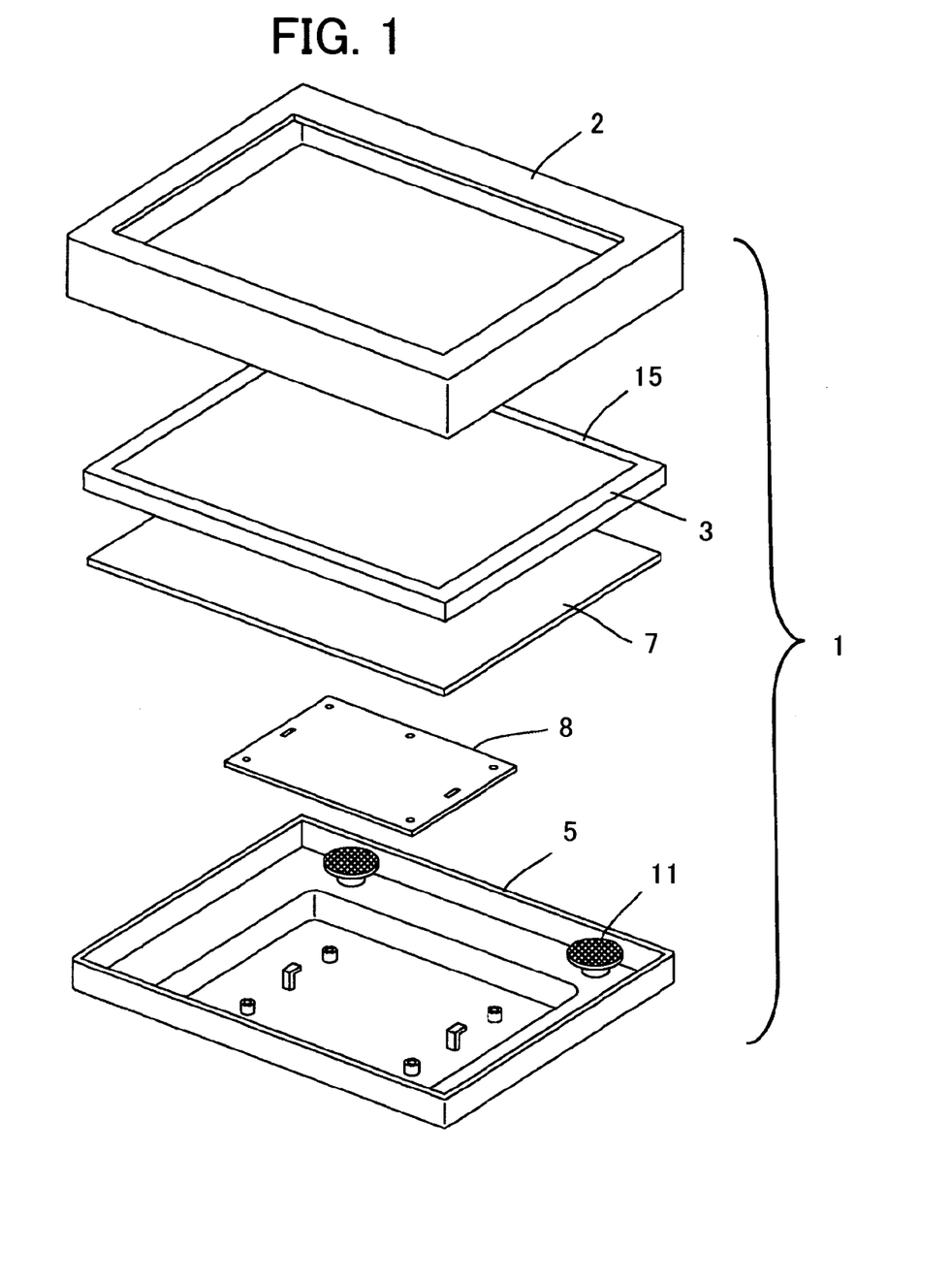
FIG. 1 is an exemplary illustration of a perspective view of a liquid crystal television set according to an embodiment of the present invention.

Now, embodiments of the present invention will be described according to the following order.
(1) Structure of the liquid crystal television set
(2) Structure of the back cabinet
(3) Modification 1
(4) Modification 2
(5) Conclusion (1) Structure of the Liquid Crystal Television Set FIG. 1 is an exploded perspective view of a liquid crystal television apparatus 1 according to an embodiment of the present invention. The liquid crystal television set I comprises a liquid crystal display panel 3 made up of a large number of cells filled with liquid crystal substances; speakers 11 outputting sound; a circuit board 7; a resin front cabinet 2; a resin back cabinet 5 attached to the back side of the front cabinet 2; a fixing bracket 8 attached to the back cabinet 5; and a support leg 13. The circuit board 7 generates a picture signal and an audio signal from a television broadcasting signal, allows the liquid crystal panel 3 to display the picture signal, allows the speakers 11 to output the sound, and includes a primary side power supply circuit. In the case of using the television set by hanging it on a wall, a hanger member 14 is added to the above components.

Figure 2:
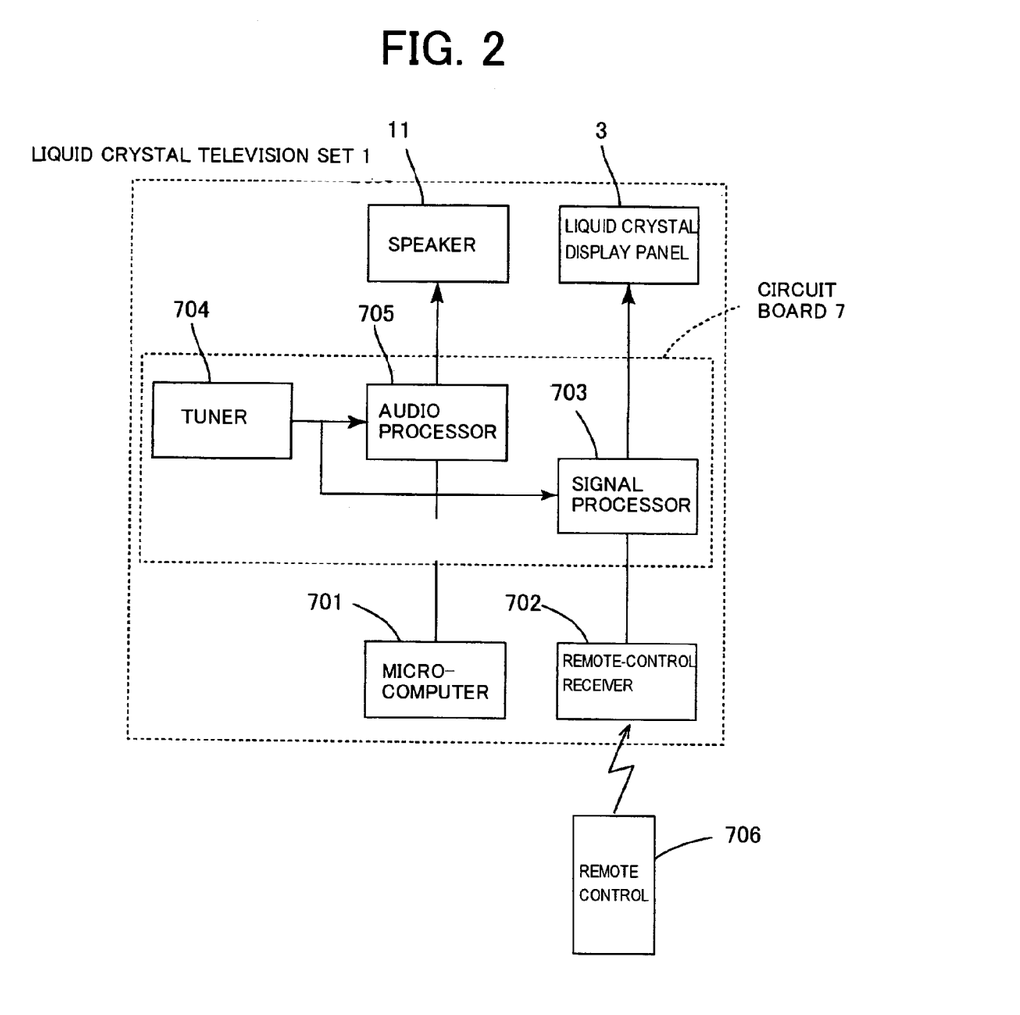
FIG. 2 is an exemplary illustration of a block diagram of a liquid crystal television set according to an embodiment of the present invention.

FIG. 2 is a block diagram showing a schematic configuration of the liquid crystal television set according to an embodiment of the present invention. In FIG. 2, the liquid crystal television set 1 has a circuit board 7 which comprises: a microcomputer 701 controlling operation of a main body; a tuner 704 extracting a television broadcasting signal of a selected channel from television broadcasting signals received by an antenna (not shown) and outputting it; a signal processor 703 displaying, on the liquid crystal display panel 3, an image based on the television broadcasting signal outputted by the tuner 704; an audio processor 705 outputting a sound based on the television broadcasting signal outputted by the tuner 4 through a speaker 3; and a remote-control receiver 702 receiving control commands transmitted from a remote control 706.

The microcomputer 701 controls ON and OFF of a power source, changing the channel, adjusting the volume, etc. according to the control commands received by the remote control receiver 702. Moreover, the power source for operation is supplied to each part of the liquid crystal television set 1 from the power supply circuit (not shown). The input of this power supply circuit is a commercial power supply (for example, AC 100V).

The liquid crystal display panel 3 is surrounded by a metal frame 15 and has a backlight 4 on the backside. In the liquid crystal display panel 3, there are arranged, in the form of a matrix, cells filled with liquid crystal substances whose orientation and transmittance of light vary according to applied voltage values. The transmittance of light of each cell is varied by applying a drive voltage, generated based on a picture signal by the circuit board 7, to each cell and an image is displayed. As a light source for this, the backlight 4 arranged at the back of the liquid crystal display panel 3 is used. The frame 15 surrounding the liquid crystal display panel 3 has holes for screws corresponding to the front cabinet 2, and it fixes the liquid crystal display panel 3 by being screwed to the front cabinet 2. Next, the circuit board 7 is fixed to the back of the liquid crystal display panel 3 by being screwed to the frame 15, and the liquid crystal display panel 3 is housed in a main body by fastening the front cabinet 2 to the back cabinet 5 with screws.

In the above structure, when the liquid crystal television set 1 is used while being hung on a wall, the hanger member 14 is fixed to the back cabinet 5. Since the liquid crystal television set 1 is of a respectable weight and the back cabinet 5 is made of resin, there was possibility that a downward force would be applied to a connected portion of the hanger member 14 and the liquid crystal television set 1, and could damage the connected portion. Therefore, the weight of the liquid crystal television set 1 is supported by fixing the metal fixing bracket 8 to the back cabinet 5, and fastening the fixing bracket 8 and the hanger member 14 with screws etc. Furthermore, a first through hole 12 is reinforced by providing a boss 9 for reinforcement in a periphery of the hole through which the screw fastening the hanger member 14 and the fixing bracket 8 passes.

Moreover, in the above structure, when using the liquid crystal television set 1 in an upright position, for the same reason, the support leg 13 is fixed to the fixing bracket 8 to support the main body 6. At this time, in order to utilize the feature of being thin of the liquid crystal television set 1, the hanger member 14 is removed, producing a gap between the boss 9 and the fixing bracket 8. Further, since the fixing bracket 8 is a metal plate, warpage etc. always occur and there exists a gap between itself and the boss 9. Therefore, if the back cabinet 5 vibrates due to sound vibration etc. from the speaker 11, the boss 9 and the fixing bracket 8 vibrate mutually, generating chatter. Therefore, in the present invention, the back cabinet 5 is provided with a hook part 16, and by adjusting the height of the boss 9, the gap between the fixing bracket 8 and the boss 9 is eliminated, preventing the chatter.

(2) Structure of the Back Cabinet

Figure 3:
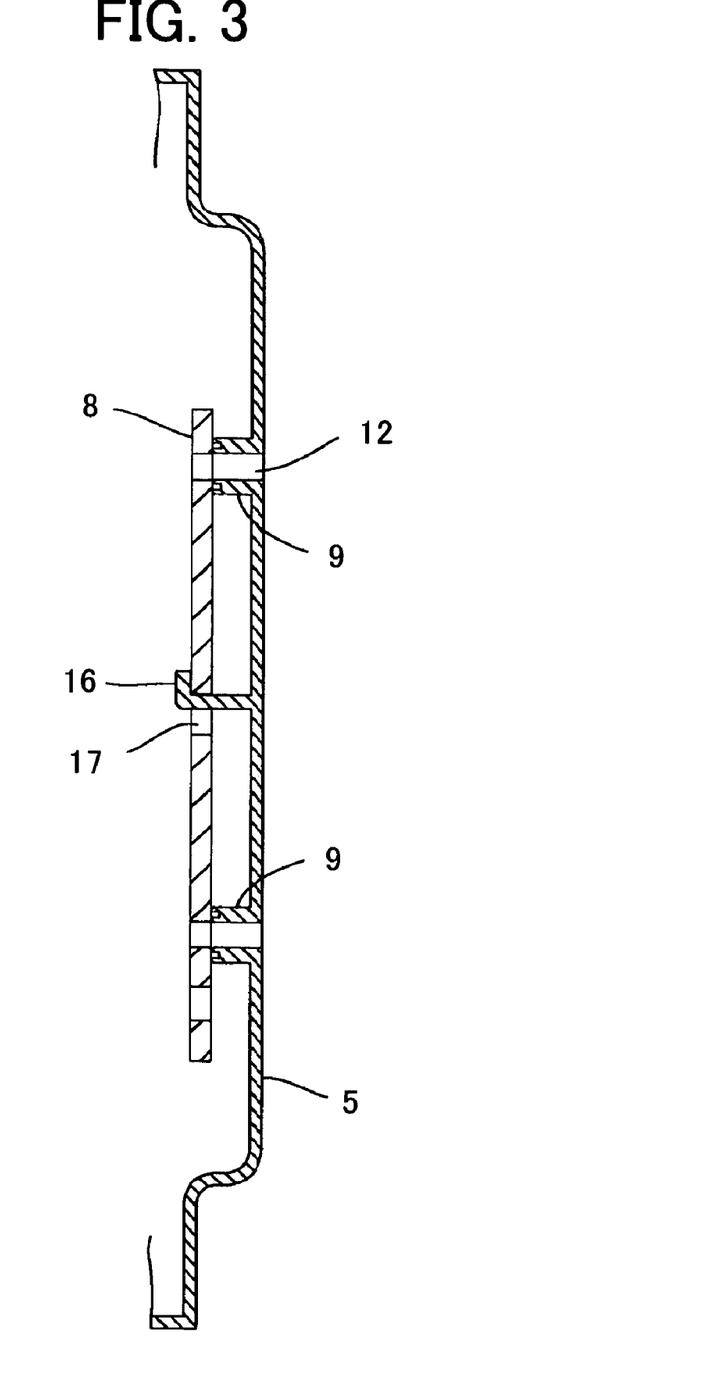
FIG. 3 is an exemplary illustration of an enlarged view of part of a section of a back cabinet in its thickness direction.
Figure 4:
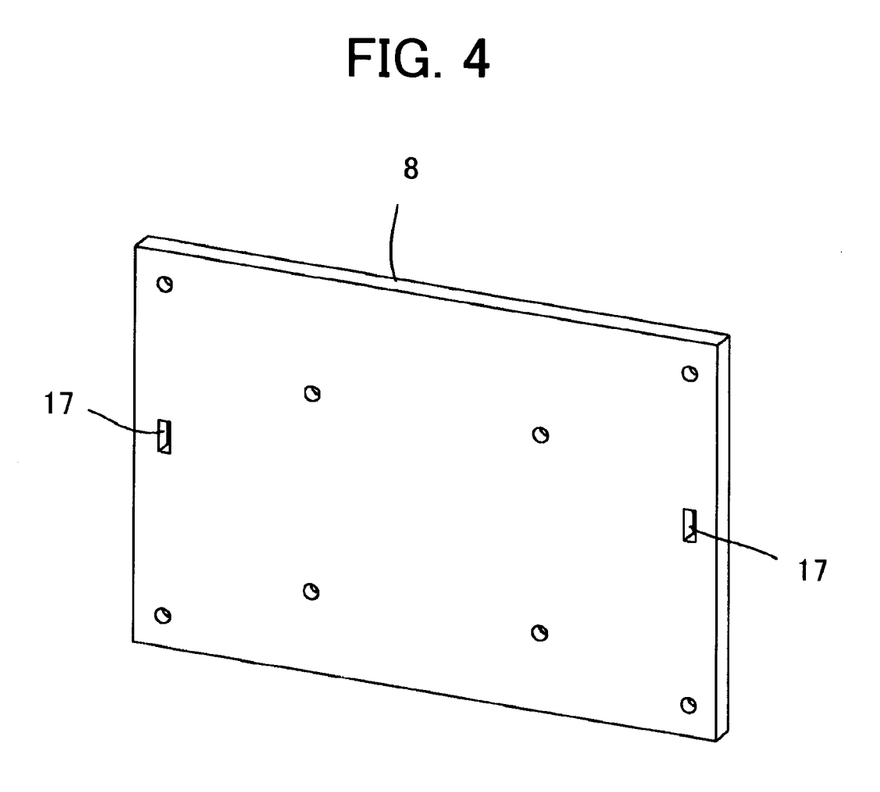
FIG. 4 is an exemplary illustration of a perspective view of a fixing bracket.

FIG. 3 is an enlarged view of part of a section in a thickness direction of the back cabinet according to an embodiment of the present invention. In the back cabinet 5, there are formed four bosses 9 of thin cylinders each having a first through hole 12 which projects from the side of a rear inside wall and passes through the back cabinet 5 in the axial direction of the boss. The four bosses 9 are so arranged that lines connecting the four bosses 9 may form a substantial quadrangle. Between opposing sides of the substantial quadrangle formed by the lines, there are provided a pair of hook parts 16 each having a tip bent in the shape of a hook projecting from the rear inside wall of the back cabinet 5. FIG. 4 is a perspective view of a fixing bracket. The fixing bracket 8 is a plate-like metal sheet which has, on both the edges, two second rectangular through holes 17 which the hook parts 16 pass through. The hook part 16 passes through the second through hole 17 of the fixing bracket 8 from the side of the rear inside wall of the back cabinet 5, and hooks a peripheral portion of the second through hole of the fixing bracket 8 so that the fixing bracket 8 may come into contact with the tip of the boss 9 protruding from the rear inside wall of the back cabinet 5. The boss 9 has a form with its axial length enabling a pressing force to be applied to the fixing bracket 8 while the fixing bracket 8 is secured to the back cabinet 5 by the hook part 16.

The length which enables the boss 9 to apply the pressing force to the fixing bracket 8 is determined as follows. For example, the rear inside wall of the back cabinet 5 being a reference, it is assumed that the length of the boss is "a," a length of the hook part 16 below its neck is "b," and a thickness of the fixing bracket 8 is "c." At this time, in the case shown by the following equation in which the sum of the length "a" of the boss 9 and the thickness "c" of the fixing bracket 8 is longer than the length "b" of the hook part 16 below its neck, the boss 9 applies a pressing force to the fixing bracket 8.

$$a+c>b$$

If this is rearranged in terms of the length "a" of the boss 9, the following equation is obtained.

$$a>b-c$$

With the length satisfying the above equation, the boss 9 applies a pressing force to the fixing bracket 8.

Figure 5:
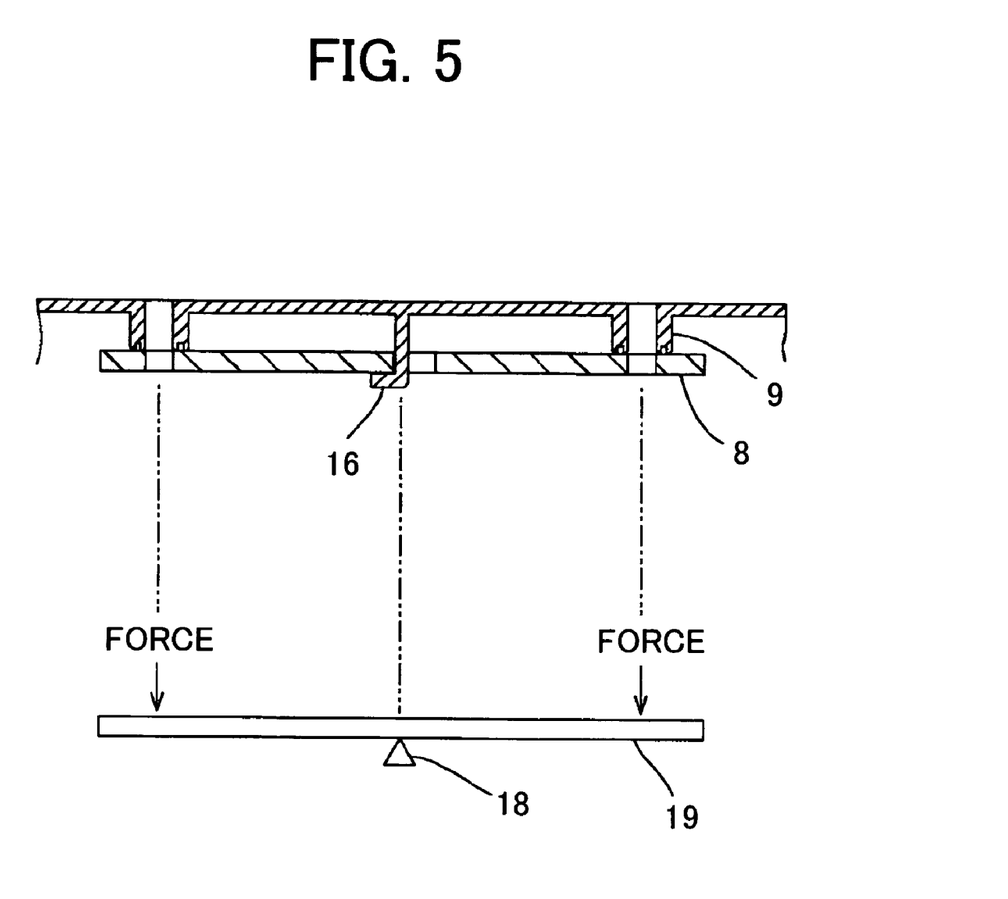
FIG. 5 is an exemplary illustration of the relation among a hook part, bosses, and the fixing bracket simplified as a structure of a beam.

FIG. 5 shows the relation among the hook part 16, the bosses 9, and the fixing bracket 8 simplified as a structure of a beam. In FIG. 5, the fixing bracket 8, the hook part 16, and the pressing force W applied to the fixing bracket 8 by the bosses are represented by a beam 19, a support 18, and forces W, respectively. Since the pressing forces W are applied to both the edges of the beam 19, there occurs warpage and both the edges of the beam 17 are lowered in a direction of the applied forces W, the support 18 being a fulcrum. When describing this again in terms of the relation among the hook part 16, the bosses 9, and the fixing bracket 8, the hook part 16 being a fulcrum, the bosses 9 make the fixing bracket 8 bend in the direction opposite to the rear inside wall of the back cabinet. When the fixing bracket 8 is bent in such a manner, it comes into contact with the tips of the bosses 9, which prevents a gap from being formed.

(3) Modification 1

With the above structure, the fixing bracket 8 comes in contact with the bosses 9, preventing chatter from occurring. However, since the fixing bracket 8 is bent by the pressing forces from the boss 9, the contact area of the fixing bracket 8 and the bosses 9 is small. In this regard, the deformation of he boss 9 is made to increase by modifying the contact surface of the fixing bracket 8 and the boss 9 so as to increase the contact area. The fixing bracket 8 is made to further come into contact with the boss 9 by this, enabling the prevention of chatter.

Generally, when a stress is applied to a material, deformation occurs as well as another stress to resist this is produced. The rate of the deformed state of the material to its original state is called a "strain $\epsilon$." The equation of the strain $\epsilon$ is shown below.

$$\epsilon = \Delta L/L$$

where a material length is L, and an amount of deformation is $\Delta$ L.

Moreover, the relation between a stress $\sigma$ and the strain $\epsilon$ can be expressed by using Young's modulus E as follows.

$$E = \sigma/\epsilon$$

In this regard, the stress $\sigma$ can be expressed by the relation between an applied constant force F and an area of a section S to which force F is applied. When these are substituted into the equation of Young's modulus E, the following equation is obtained.

$$E = F/S/\epsilon = (F \times L)/(\Delta L \times S)$$

When the above equation in terms of Young's modulus E is transformed into the equation in terms of $\Delta$ L, the following equation is obtained.

$$\Delta L = (F \times L)/(E \times S)$$

If F, L, and E are constant in the above equation, $$\Delta L = A/S \quad \text{(A: Constant)}$$

Thus, the deformation $\Delta L$ becomes greater as the area of the section S decreases.

Figure 6:
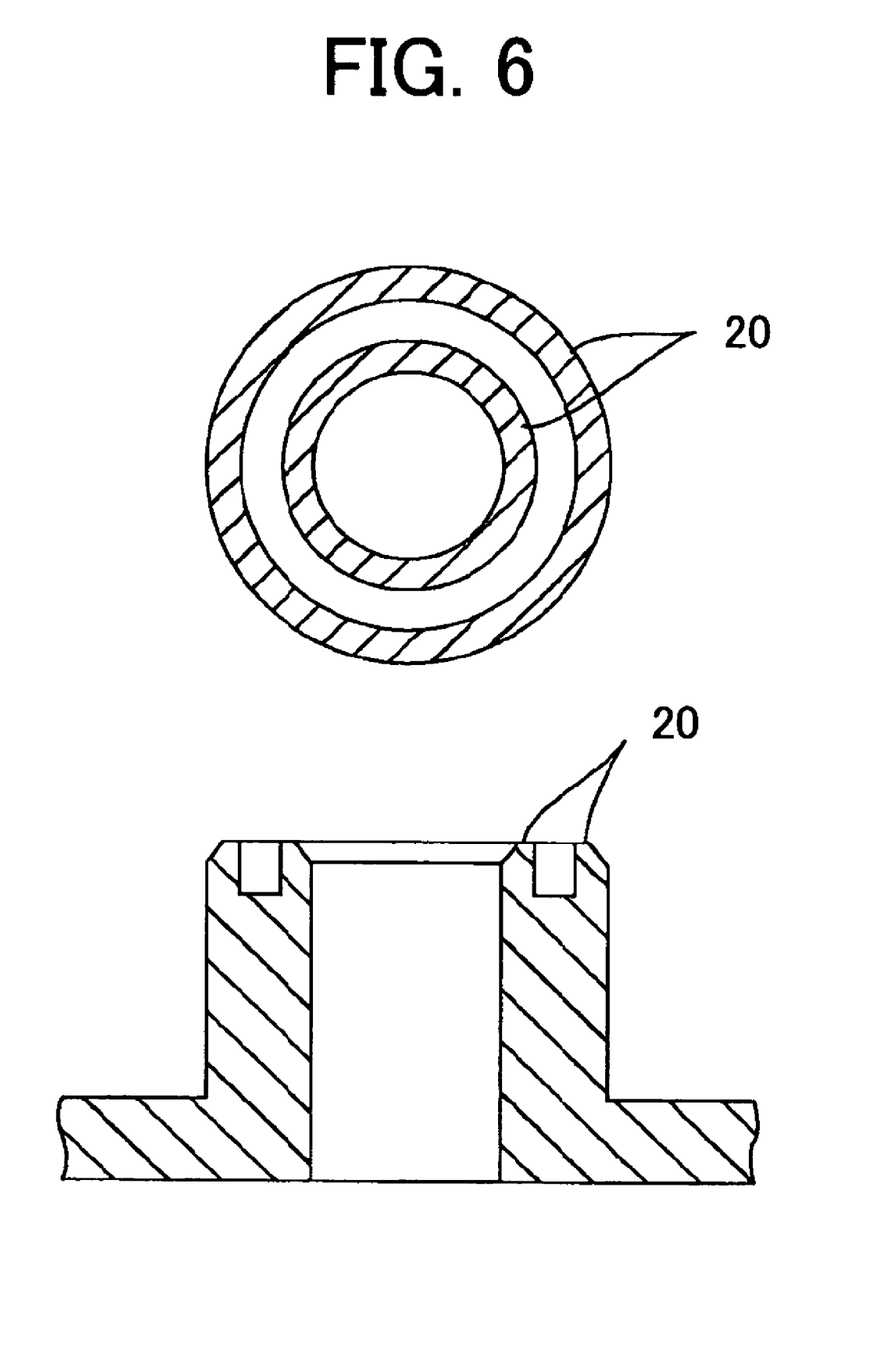
FIG. 6 is an exemplary illustration of an enlarged view of a tip of the boss.

FIG. 6 is an enlarged view of a tip of the boss according to an embodiment of the present invention. The boss 9 is formed such that two annular ribs 20 whose radiuses from an axis differ are provided, protruding from the tip of the boss 9, around the first through hole 12 of the tip of the boss. The two ribs protrude from the tip of the boss 9. The reaction force to the force applied on the fixing bracket 8 is added to the ribs 20, causing the ribs to be strain-deformed. Since the contact surface of the rib 20 to which the reaction force is applied is small, the rib 20 deforms considerably due to the strain and becomes easily collapsed.

Figure 7:
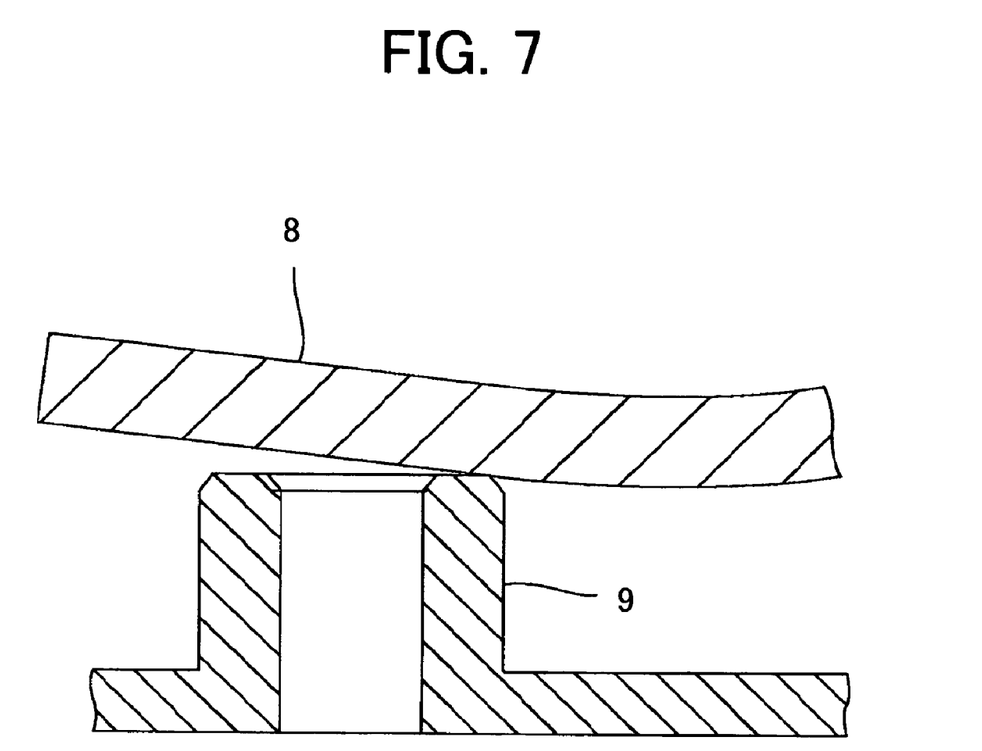
FIG. 7 is an exemplary illustration of an enlarged view of a contact portion of the boss not having ribs at its tip and the fixing bracket.
Figure 8:
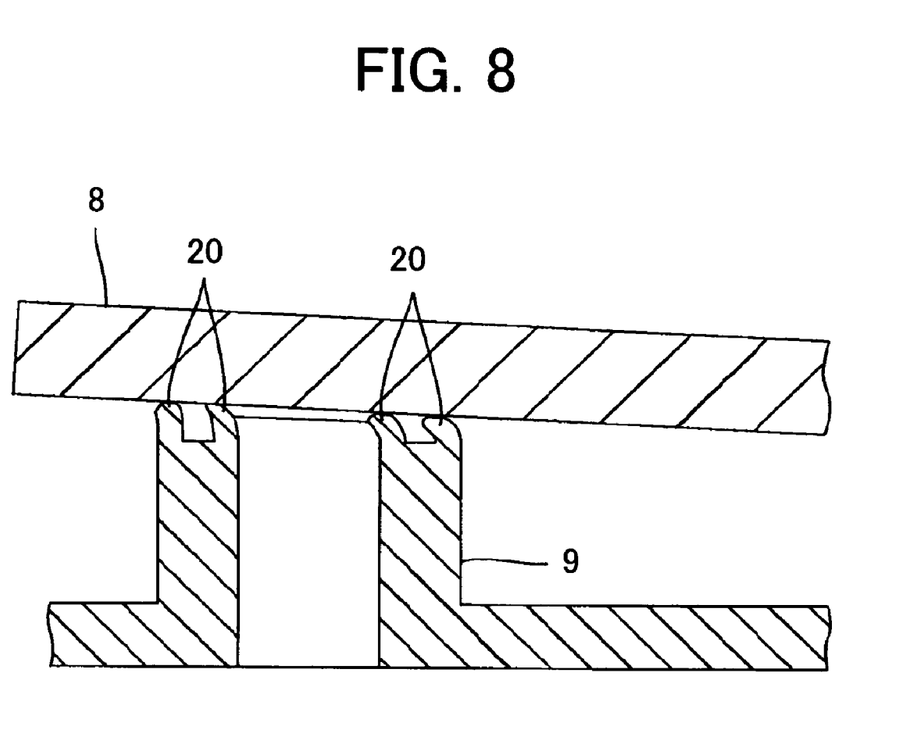
FIG. 8 is an exemplary illustration of an enlarged view of a contact portion of the boss having ribs at its tip and the fixing bracket.

FIG. 7 is an enlarged view of a contact portion of the boss 9 not having ribs 20 at its tip and the fixing bracket 8 according to an embodiment of the present invention. FIG. 8 is an enlarged view of a contact portion of the boss 9 having ribs 20 at its tip and the fixing bracket 8 according to an embodiment of the present invention. In FIG. 7, the fixing bracket 8 is warped with the hook part 16 being a fulcrum because of a pressing force from the boss and, for this reason, the tip of the boss 9 and the fixing bracket 8 are in contact at a certain point only. Therefore, a gap is produced between the boss 9 and the fixing bracket 8. In FIG. 8, although the fastening bracket 8 is similarly in contact with the ribs 20, the ribs 20 are deformed by a strain so that the fixing bracket 8 and the boss 9 are not in contact at one point, reducing the gap between the fixing bracket 8 and the ribs 20. Accordingly, further effect of preventing chatter can be obtained.

(4) Modification 2

The fixing bracket 8 and the boss 9 reduce a gap and prevent chatter according to the structure described above. Moreover, by securing the fixing bracket 8 and the back cabinet 5 by the hook part 16 and then fastening them with screws, it becomes possible to further reduce the gap between the fixing bracket 8 and the boss 9, and to prevent the chatter.

Figure 9:
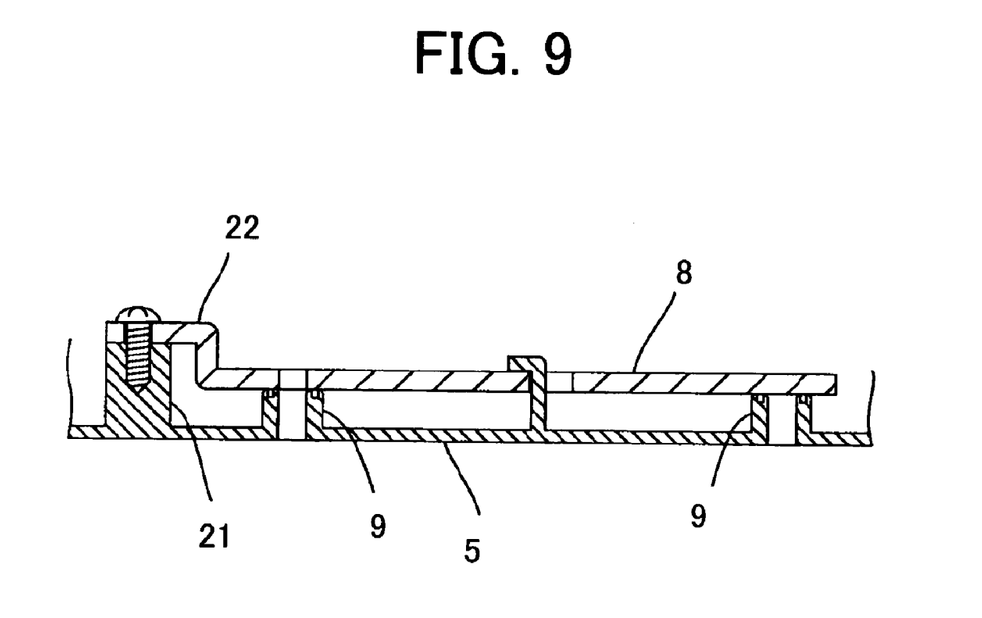
FIG. 9 is an exemplary illustration of an enlarged view of part of the back cabinet.

FIG. 9 is an enlarged view of part of the back cabinet according to an embodiment of the present invention. The back cabinet 5 is provided with a first seat 21 which is protruding from the rear inside wall higher than the boss 9. Further, a female edge portion of the fixing bracket 8, there is provided a one-step higher second seat 22 in a step-like manner. Further, in a substantial central part of the second seat 22,;there is provided a through hole for screwing opposite to the female screw portion of the first seat 21 of the back cabinet 5. The first seat 21 and the second seat 22 are screwed so as to be in contact with each other. With the above structure, the fixing bracket 8 is further pressed by the screw to the boss 9 erected on the rear inside wall of the back cabinet 5. Thus, the fixing bracket 8 and the boss 9 further press the contact surface and reduces a gap produced in the contact portion of the fixing bracket 8 and the boss 9. After having been fixed by the hook part 16, the fixing bracket 8 and the back cabinet 5 are further fastened by screws etc. Therefore, stiffness of the fixed portion of the fixing bracket 8 and the back cabinet 5 is improved, making it possible for the support leg 13 fixed to the fixing bracket 8 to endure the increase in weight of the main body 6.

(5) Conclusion

Thus, according to the present invention, the fixing bracket 8 is fixed in such a way that it comes into contact with the tip of the boss 9 erected on the rear inside wall of the back cabinet 5 through the medium of the hook part 16 erected on the rear inside wall of the back cabinet 5 forming part of the main body of the liquid crystal television set 1. With the above structure, when using the main body by supporting it with the support leg 13, a gap between the fixing bracket 8 and the boss 9 is reduced and the fixing bracket 8 and the boss 9 are kept in contact. Accordingly, chatter generated by interference between the fixing bracket 8 and the boss 9 caused by sound vibration etc. is prevented.

It is needless to say that the present invention is not limited to the above embodiments. The points described below should be apparent to those skilled in the art.

To apply mutually replaceable members and structures disclosed in the above embodiments by changing the combination thereof as required.

To replace, as required, the members and structures disclosed in the above embodiments with mutually replaceable members and structures not disclosed in the above embodiment but known in the art, and to apply them by changing the combination thereof To replace, as required, the members and structures disclosed in the above embodiments with members and structures which are not disclosed in the above embodiments but can be used as substitutes for the members and structures disclosed in the above embodiments by those skilled in the art based on known arts etc. and to apply them by changing the combination thereof.

The three points described above are to be disclosed as one embodiment of the present invention.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A liquid crystal television set comprising:
   a liquid crystal display panel provided with a backlight including an inverter circuit and a fluorescent tube, and formed of a plurality of picture elements for displaying an image;
   a speaker outputting sound based on an audio signal;
   a circuit board receiving a television broadcast, having the liquid crystal display panel show the image, having the speaker output the sound, and including a primary side power supply circuit;
   a main body made up of a resin front cabinet forming a display window for the liquid crystal display panel in the front thereof and a resin back cabinet attached to the back of the front cabinet and accommodating the liquid crystal display panel, the speaker, and the circuit board;
   a plate-like fixing bracket attached to a rear inside wall of the back cabinet;
   a support leg supporting the main body from below through the medium of the fixing bracket; and
   a hanger member attached to the back of the cabinet,
   four bosses with tips contacting the fixing bracket being erected on the rear inside wall of the back cabinet so that lines connecting the four bosses form a substantial quadrangle, each boss being provided with a first through hole passing through the boss in its erected direction and also passing through the rear inside wall of the back cabinet, and the hanger member being removably fastened to the fixing bracket with screws passing through the first through holes, wherein, on the rear inside wall of the back cabinet, there is erected a hook part, protruding towards the fixed bracket, between opposing sides of the substantial quadrangle formed by the lines connecting the bosses, the tip of the hook part being bent in the shape of a hook;

wherein the fixing bracket has a second through hole through which the tip of the hook part can pass towards the boss erected corresponding to the position of the hook part;

wherein the tip of the hook part can pass through the second through hole of the fixing bracket from the side of the rear inside wall of the back cabinet to the front side, insert a peripheral portion of the second through hole of the fixing bracket in a recess of the rear inside wall of the back cabinet to hook the peripheral portion there and, also, is positioned such that a pressing force is applied to the fixing bracket from the tip of the boss contacting the fixing bracket when the fixing bracket is hooked;

wherein, when each of the screws passing through the boss is unscrewed and the hanger member is removed, with respect to the fixing bracket hooked by the hook part, the pressing force is applied to the fixing bracket from the tip of the boss contacting the fixing bracket;

wherein, at the tip of the boss erected on the rear inside wall of the back cabinet, plastic ribs thinner than the boss are formed twofold facing the fixing bracket; and wherein the fixing bracket is fastened to the rear inside wall of the back cabinet with screws.

2. A liquid crystal display comprising:

a main body having a cabinet forming a display window for the liquid crystal display panel in the front thereof;

a plate-like fixing bracket attached to a rear inside wall of the cabinet;

a support leg supporting the main body from below through the medium of the fixing bracket; and a hanger member attached to the back of the cabinet, a plurality of bosses with tips contacting the fixing bracket being erected on the rear inside wall of the cabinet, each boss being provided with a first through hole passing through the boss in its erected direction and also passing through the rear inside wall of the cabinet, and the hanger member being removably fastened to the fixing bracket with screws passing through the first through holes, wherein, on the rear inside wall of the cabinet, there is erected a hook part, protruding towards the fixing bracket, between the bosses, the tip of the hook part being bent in the shape of a hook;

wherein the fixing bracket has a second through hole through which the tip of the hook part can pass towards the boss erected corresponding to the position of the hook part;

wherein the tip of the hook part can pass through the second through hole of the fixing bracket from the side of the rear inside wall of the cabinet to the front side, insert a peripheral portion of the second through hole of the fixing bracket in a recess of the rear inside wall of the cabinet to hook the peripheral portion there and, also, is positioned such that a pressing force is applied to the fixing bracket from the tip of the boss contacting the fixing bracket when the fixing bracket is hooked; and wherein, when each of the screws passing through the boss is unscrewed and the hanger member is removed, with respect to the fixing bracket hooked by the hook part, the pressing force is applied to the fixing bracket from the tip of the boss contacting the fixing bracket.

3. A liquid crystal display according to claim 2, wherein a plurality of plastic ribs thinner than the boss is formed, facing the fixing bracket, at the tip of the boss erected on the rear inside wall of the cabinet.

4. A liquid crystal display according to claim 2, wherein the fixing bracket is fastened to the rear inside wall of the cabinet with screws.

5. A liquid crystal display according to claim 2, wherein there are provided on the cabinet four thin cylindrical bosses protruding from the side of the rear inside wall each having the first through hole passing through the cabinet in the axial direction of the boss; and wherein the four bosses are arranged so that lines connecting the bosses form a substantial quadrangle.

6. A liquid crystal display according to claim 5, wherein, between the opposing sides of the substantial quadrangle formed by the lines, there are respectively formed hook parts protruding from the rear inside wall of the cabinet, the tip of each hook part being bent in the shape of a hook.

7. A liquid crystal display according to claim 2, wherein the fixing bracket is a plate-like metal sheet having, at both the edges, the two second rectangular through holes which the hook parts pass through.

8. A liquid crystal display according to claim 2, wherein the boss is constructed such that two annular ribs having different radiuses from the axis are formed around the first through hole of the tip of the boss in a protruding manner from the tip of the boss.

9. A liquid crystal display according to claim 2, wherein the cabinet is provided with a first seat which protrudes from the rear inside wall higher than the boss;

wherein a female screw portion is provided in a substantial central part of the first seat;

wherein there is provided at the substantial edge portion a one-step higher second seat in a step-like manner;

wherein there is provided a through hole for screwing opposite to the female screw portion of the first seat of the back cabinet; and wherein the first seat and second seat are screwed so as to be in contact with each other.

* * * * *